US011283988B2

(12) United States Patent
Shibuno

(10) Patent No.: US 11,283,988 B2
(45) Date of Patent: Mar. 22, 2022

(54) IMAGING APPARATUS

(71) Applicant: Panasonic Intellectual Property Management Co., Ltd., Osaka (JP)

(72) Inventor: Koji Shibuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/911,496

(22) Filed: Jun. 25, 2020

(65) Prior Publication Data

US 2020/0412968 A1 Dec. 31, 2020

(30) Foreign Application Priority Data

Jun. 27, 2019 (JP) ............................ JP2019-120392

(51) Int. Cl.
*H04N 5/232* (2006.01)
*G03B 13/36* (2021.01)

(52) U.S. Cl.
CPC ....... *H04N 5/232127* (2018.08); *G03B 13/36* (2013.01)

(58) Field of Classification Search
CPC ....... H04N 5/232127; H04N 5/232125; H04N 5/23212; H04N 5/23216; G03B 13/36
See application file for complete search history.

(56) References Cited

U.S. PATENT DOCUMENTS 7,324,151 B2 1/2008 Onozawa
8,300,139 B2 * 10/2012 Takayama .......... H04N 5/23212 348/349
9,251,571 B2 * 2/2016 Tay .................. H04N 5/232123
9,477,138 B2 10/2016 Brunner et al.
2005/0078381 A1 * 4/2005 Okawara ................. G03B 3/10 359/697
2005/0189419 A1 9/2005 Igarashi et al.
2006/0171699 A1 8/2006 Nakai
2008/0055457 A1 * 3/2008 Nakahara ................ G02B 7/08 348/335

(Continued)

FOREIGN PATENT DOCUMENTS

JP 2000-121918 A 4/2000
JP 2001-166200 A 6/2001

(Continued)

OTHER PUBLICATIONS

Related U.S. Appl. No. 16/911,464, filed Jun. 25, 2020.

(Continued)

*Primary Examiner* — Shahbaz Nazrul
(74) *Attorney, Agent, or Firm* — Renner, Otto, Boisselle & Sklar, LLP

(57) ABSTRACT

An imaging apparatus includes an imager and a controller, wherein the controller calculates the evaluation value over a detection range with respect to position of the focus lens to perform the focusing operation, and in response to an instruction to reduce or increase a distance to a subject to be focused, the controller sets, in the detection range with respect to position of the focus lens, a region including a position close to a closest end or an infinite end with respect to a current position of the focus lens according to a direction specified by the instruction, as a focusing region, and adjusts the position of the focus lens within the set focusing region in the focusing operation.

10 Claims, 8 Drawing Sheets

START
S1 IS RELEASE BUTTON HALF-PRESSED? YES / NO
S2 IS NEAR SHIFT INPUT? YES / NO
S3 IS FAR SHIFT INPUT? YES / NO
S4 SET ENTIRE REGION OF DETECTION RANGE AS FOCUS REGION
S5 SET NEAR REGION IN DETECTION RANGE AS FOCUS REGION
S6 SET FAR REGION IN DETECTION RANGE AS FOCUS REGION
S7 DETECT EVALUATION VALUE IN DETECTION RANGE
S8 FOCUSING OPERATION IN SET FOCUSING REGION
S9 IS USER OPERATION DISCONTINUED? YES / NO
S10 IS RELEASE BUTTON FULL-PRESSED? YES / NO
S11 SHOOT IMAGE

(56) References Cited

U.S. PATENT DOCUMENTS

| | | | | |
|---|---|---|---|---|
| 2009/0059057 | A1* | 3/2009 | Long | H04N 5/23232 348/343 |
| 2009/0115883 | A1 | 5/2009 | Tsuchiya | |
| 2010/0067891 | A1* | 3/2010 | Uenishi | H04N 5/232123 396/104 |
| 2012/0027393 | A1* | 2/2012 | Tsuda | H04N 5/23212 396/102 |
| 2013/0250165 | A1* | 9/2013 | Hamada | G02B 7/365 348/353 |
| 2013/0293766 | A1 | 11/2013 | Sugimoto | |
| 2016/0103830 | A1 | 4/2016 | Cheong et al. | |
| 2017/0264819 | A1* | 9/2017 | Okamoto | H04N 5/772 |
| 2017/0347017 | A1 | 11/2017 | Ito | |
| 2018/0172949 | A1* | 6/2018 | Oogami | H04N 5/232133 |
| 2019/0394409 | A1 | 12/2019 | Matsumoto | |

FOREIGN PATENT DOCUMENTS

| | | | |
|---|---|---|---|
| JP | 2001-208963 | A | 8/2001 |
| JP | 2004-093776 | A | 3/2004 |
| JP | 2006-259688 | A | 9/2006 |
| JP | 2009-115921 | A | 5/2009 |
| JP | 2014-056153 | A | 3/2014 |
| JP | 2019-041178 | A | 3/2019 |

OTHER PUBLICATIONS

Related U.S. Appl. No. 16/957,826, filed Jun. 25, 2020.

International Search Report for related Application No. PCT/JP2019/025675, dated Sep. 24, 2019.

English language translation of the Written Opinion of the International Searching Authority for corresponding International Application PCT/JP2019/025675, dated Sep. 24, 2019.

Extended European Search Report for corresponding European Application No. 20181381.3 dated Oct. 30, 2020.

International Search Report for corresponding International Application No. PCT/JP2019/025675 dated Sep. 24, 2019, English translation.

Extended European Search Report for corresponding European Application No. 19906595.4 dated Dec. 21, 2020.

Office Action for related U.S. Appl. No. 16/911,464, dated Apr. 2, 2021.

Office Action from related U.S. Appl. No. 16/911,464, dated Sep. 20, 2021.

International Preliminary Report on Patentability of related International Application No. PCT/JP2019/025675 dated Dec. 28, 2021 (English translation).

Office Action from related U.S. Appl. No. 16/911,464 dated Jan. 6, 2022.

* cited by examiner 1
200
GYRO SENSOR
224
210
220
260
230
222
221
211
262
233
ZOOM LENS DRIVER
POSITION SENSOR
OIS DRIVER
DIAPHRAGM DRIVER
FOCUS LENS DRIVER
OIS PROCESSOR
223
250
LENS CONTROLLER
240
241
RAM
FLASH MEMORY
242
150
L/M
B/M
130
100
182
181
OPERATION MEMBER
POSITION SENSOR
SENSOR DRIVER
110
184
GYRO SENSOR
IMAGE SENSOR
120
183
BIS PROCESSOR
LCD
TG
ADC
112
111
140
CAMERA CONTROLLER
170
171
160
141
142
POWER SUPPLY
RAM
FLASH MEMORY
CARD SLOT
MEMORY CARD

NEAR SHIFT

FAR SHIFT

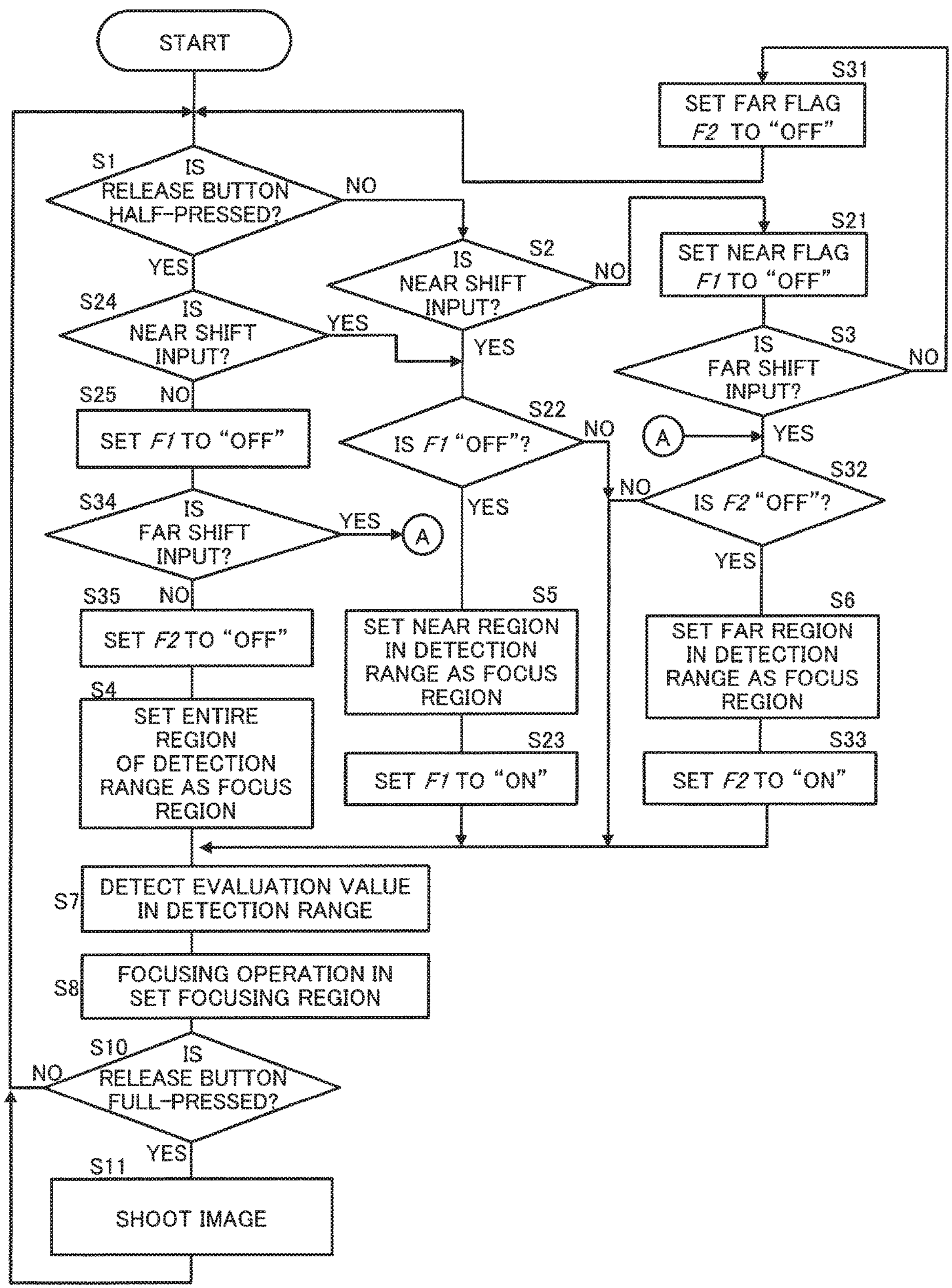
FIG. 7
START
S1
IS RELEASE BUTTON HALF-PRESSED?
NO
YES
S2
IS NEAR SHIFT INPUT?
NO
YES
S21
SET NEAR FLAG F1 TO "OFF"
S3
IS FAR SHIFT INPUT?
NO
YES
S31
SET FAR FLAG F2 TO "OFF"
S24
IS NEAR SHIFT INPUT?
YES
NO
S25
SET F1 TO "OFF"
S34
IS FAR SHIFT INPUT?
YES
A
NO
S35
SET F2 TO "OFF"
S4
SET ENTIRE REGION OF DETECTION RANGE AS FOCUS REGION
S22
IS F1 "OFF"?
NO
YES
S5
SET NEAR REGION IN DETECTION RANGE AS FOCUS REGION
S23
SET F1 TO "ON"
A
S32
IS F2 "OFF"?
NO
YES
S6
SET FAR REGION IN DETECTION RANGE AS FOCUS REGION
S33
SET F2 TO "ON"
S7
DETECT EVALUATION VALUE IN DETECTION RANGE
S8
FOCUSING OPERATION IN SET FOCUSING REGION
S10
IS RELEASE BUTTON FULL-PRESSED?
NO
YES
S11
SHOOT IMAGE

IMAGING APPARATUS

TECHNICAL FIELD

The present disclosure relates to an imaging apparatus that performs a focusing operation.

BACKGROUND

JP 2019-41178 discloses an autofocus (AF) technique used for a digital still camera, a digital video camera, and the like, and particularly discloses an automatic focusing apparatus using an autofocus technique based on an image plane phase difference method.

SUMMARY

The present disclosure provides an imaging apparatus capable of easily focusing on a desired subject.

An imaging apparatus according to the present disclosure, includes: an imager configured to capture a subject image formed via an optical system including a focus lens, to generate image data; and a controller configured to control a focusing operation for adjusting a position of the focus lens along an optical axis in the optical system according to an evaluation value for focus state, wherein the controller calculates the evaluation value over a detection range with respect to position of the focus lens to perform the focusing operation, and in response to an instruction to reduce or increase a distance to a subject to be focused, the controller sets, in the detection range with respect to position of the focus lens, a region including a position close to a closest end or an infinite end with respect to a current position of the focus lens according to a direction specified by the instruction, as a focusing region, and adjusts the position of the focus lens within the set focusing region in the focusing operation.

According to the imaging apparatus in the present disclosure, it is possible to facilitate focusing on a desired subject.

BRIEF DESCRIPTION OF THE DRAWINGS

FIG. 7 is a flowchart illustrating a shooting operation of a digital camera according to a second embodiment.

DETAILED DESCRIPTION

Hereinafter, embodiments of the present disclosure will be described with reference to the drawings as appropriate. However, in the detailed description, unnecessary portions of the description related to the prior art and substantially the same configuration may be omitted. This is to simplify the explanation. Also, the following description and the accompanying drawings are disclosed to enable those skilled in the art to fully understand the present disclosure, and are not intended to limit the subject matter of the claims.

First Embodiment

Hereinafter, the configuration and operation of a digital camera that is an embodiment of an imaging apparatus according to the present disclosure will be described.

1. Configuration

Figure 1:
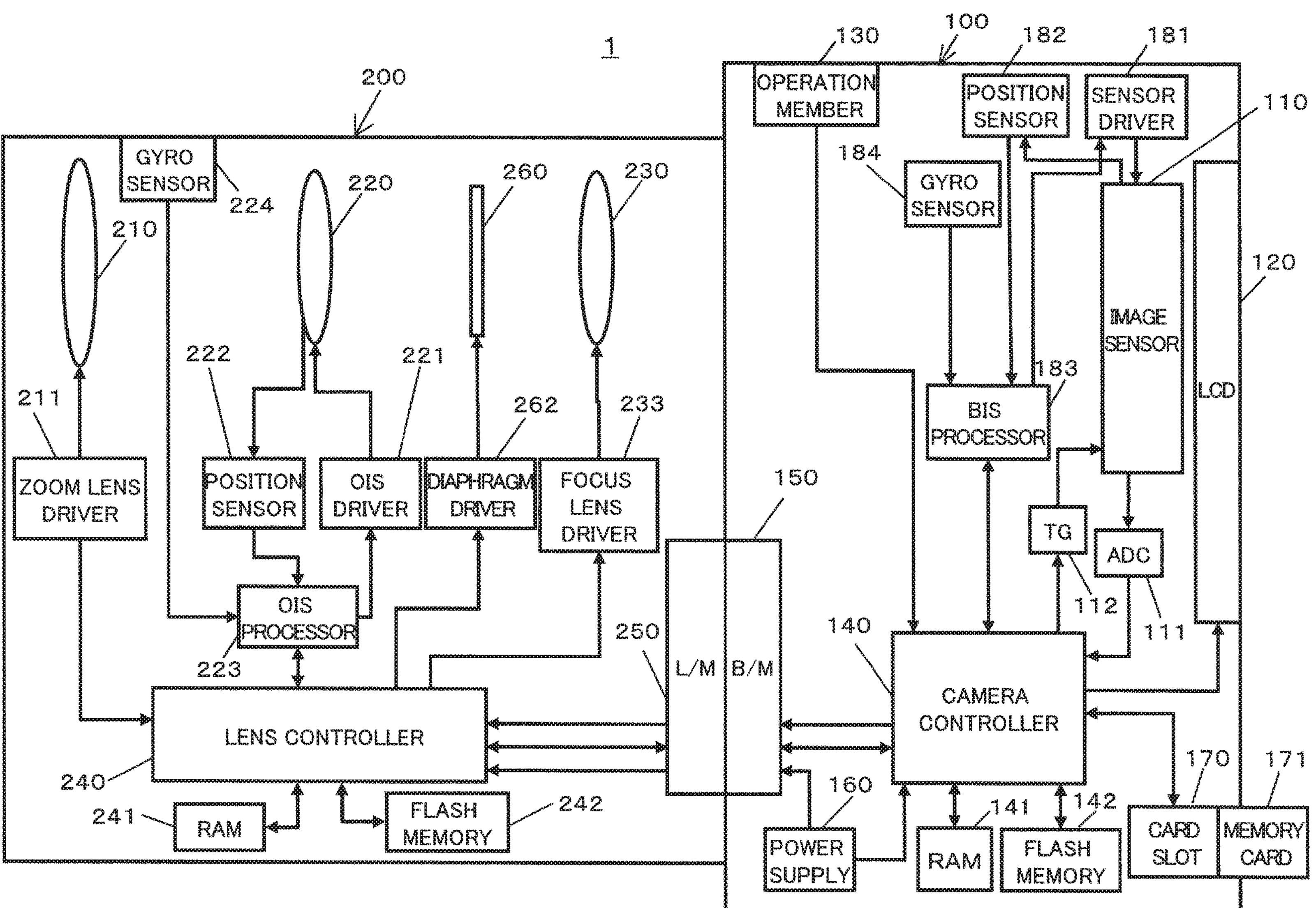
FIG. 1 is a block diagram illustrating a configuration of a digital camera according to a first embodiment of the present disclosure.

FIG. 1 is a block diagram illustrating a configuration of a digital camera 1 according to the first embodiment. The digital camera 1 according to this embodiment includes a camera body 100 and an interchangeable lens 200 that can be attached to and detached from the camera body 100.

1-1. Camera Body

The camera body 100 (an example of an imaging apparatus) includes an image sensor 110, a liquid crystal monitor 120, an operation member 130, a camera controller 140, a body mount 150, a power source 160, and a card slot 170.

The camera controller 140 controls the overall operation of the digital camera 1 by controlling components such as the image sensor 110 in accordance with an instruction from the operation member 130. The camera controller 140 transmits a vertical synchronization signal to a timing generator 112. In parallel with this, the camera controller 140 generates an exposure synchronization signal. The camera controller 140 periodically transmits the generated exposure synchronization signal to a lens controller 240 via the body mount 150 and a lens mount 250. The camera controller 140 uses a DRAM 141 as a work memory during control operations and image processing operations.

The image sensor 110 is an element that captures a subject image incident through the interchangeable lens 200 and generates image data. The image sensor 110 is a CMOS image sensor, for example. The generated image data is digitized by an AD converter 111. The digitized image data is subjected to predetermined image processing by the camera controller 140. The predetermined image processing includes, for example, gamma correction processing, white balance correction processing, defect correction processing, YC conversion processing, electronic zoom processing, and JPEG compression processing. The image sensor 110 may be a CCD or NMOS image sensor or the like.

The image sensor 110 according to the first embodiment includes a phase difference sensor for an image plane phase difference method. Using the phase difference sensor, the camera controller 140 is configured to execute autofocus by the image plane phase difference method.

An example of principle of autofocus by the image plane phase difference method will be described here. Each pixel of an imaging element in the phase difference sensor of the image sensor 110 described above includes one microlens and two pixels adjacent in the left-right direction. Each pixel is provided with a pupil division function of phase difference AF, a light beam that has passed through the right half of a shooting optical system is guided to the left pixel, and a light beam that has passed through the left half of the shooting optical system is guided to the right pixel. A relative position between an image based on an image signal captured by a left pixel group and an image based on an image signal captured by a right pixel group is detected to calculate the degree of coincidence between the outputs of the left and right phase difference pixel groups as an evaluation value. A focusing operation for adjusting a position of a focus lens 230 is performed based on the evaluation value.

The image sensor 110 operates at a timing controlled by the timing generator 112. The image sensor 110 generates a still image, a moving image, or a through image for recording. The through image is mainly a moving image, and is displayed on the liquid crystal monitor 120 in order for a user to determine a composition for capturing a still image.

The liquid crystal monitor 120 displays an image such as a through image and various pieces of information such as a menu screen. Instead of the liquid crystal monitor, other types of display devices, for example, organic EL display devices may be used.

The operation member 130 includes various operation members such as a release button for instructing start of shooting, a mode dial for setting a shooting mode, and a power switch. The operation member 130 in the camera body 100 is illustrated in FIG. 2.

Figure 2:
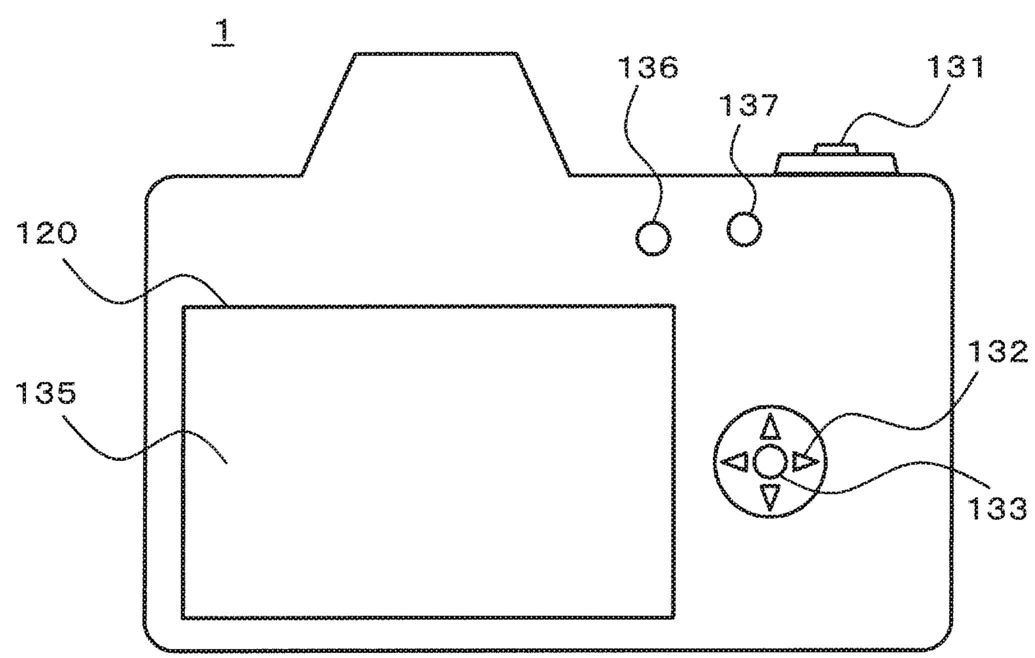
FIG. 2 is a view showing the back of the digital camera.

FIG. 2 is a view showing the back of the digital camera 1. FIG. 2 shows, as an example of the operation member 130, a release button 131, selection buttons 132, a determination button 133, a touch panel 135, and a plurality of function buttons 136 and 137 (hereinafter referred to as "Fn buttons"). The operation member 130, when receiving an operation by the user, transmits various instruction signals to the camera controller 140.

The release button 131 is a two-stage depression type button. When the release button 131 is half-pressed by the user, the camera controller 140 executes autofocus control (AF control), auto exposure control (AE control), and the like. When the release button 131 is fully pressed by the user, the camera controller 140 records image data captured at the timing of the pressing operation as a recorded image in a memory card 171 or the like.

The selection buttons 132 are depression type buttons provided in the up/down/left/right directions. The user can select various condition items displayed on the liquid crystal monitor 120 or move a cursor by depressing one of the selection buttons 132 in the up/down/left/right directions.

The determination button 133 is a depression type button. When the determination button 133 is depressed by the user while the digital camera 1 is in the shooting mode or a playback mode, the camera controller 140 displays a menu screen on the liquid crystal monitor 120. The menu screen is a screen for setting various conditions for shooting/playback. When the determination button 133 is depressed when a setting item for various conditions is selected, the camera controller 140 determines the setting of the selected item.

The touch panel 135 is arranged so as to overlap with the display screen of the liquid crystal monitor 120, and detects a touch operation on the display screen by the user's finger. As a result, the user can perform operations such as designation of an area for the image displayed on the liquid crystal monitor 120.

The Fn buttons 136 and 137 are depression type buttons. Each of the Fn buttons 136 and 137 can be assigned a user-desired function such as a near/far shift function, which will be described later, by setting on the menu screen, for example.

Returning to FIG. 1, the card slot 170 can be loaded with the memory card 171 and controls the memory card 171 based on the control from the camera controller 140. The digital camera 1 can store image data in the memory card 171 and can read image data from the memory card 171.

The power source 160 is a circuit that supplies power to each element in the digital camera 1.

The body mount 150 can be mechanically and electrically connected to the lens mount 250 of the interchangeable lens 200. The body mount 150 can transmit and receive data to and from the interchangeable lens 200 via the lens mount 250. The body mount 150 transmits the exposure synchronization signal received from the camera controller 140 to the lens controller 240 via the lens mount 250. Also, other control signals received from the camera controller 140 are transmitted to the lens controller 240 via the lens mount 250. The body mount 150 transmits a signal received from the lens controller 240 via the lens mount 250 to the camera controller 140. The body mount 150 supplies power from the power source 160 to the whole interchangeable lens 200 via the lens mount 250.

In addition, the camera body 100 further includes, as a configuration to realize a BIS function (function to correct camera shake by shifting the image sensor 110), a gyro sensor 184 (blur detector) that detects a blur of the camera body 100 and a BIS processer 183 that controls blur correction processing based on the detection result of the gyro sensor 184. The camera body 100 furthermore includes a sensor driver 181 that moves the image sensor 110 and a position sensor 182 that detects the position of the image sensor 110.

The sensor driver 181 can be realized by a magnet and a flat coil, for example. The position sensor 182 is a sensor that detects the position of the image sensor 110 in a plane perpendicular to the optical axis of the optical system. The position sensor 182 can be realized by a magnet and a Hall element, for example.

The BIS processor 183 controls the sensor driver 181 based on a signal from the gyro sensor 184 and a signal from the position sensor 182 to shift the image sensor 110 in a plane perpendicular to the optical axis so as to cancel the blur of the camera body 100. A range in which the image sensor 110 can be driven by the sensor driver 181 is mechanically limited. A range in which the image sensor 110 can be mechanically driven is referred to as a "drivable range".

1-2. Interchangeable Lens

The interchangeable lens 200 includes an optical system, a lens controller 240, and a lens mount 250. The optical system includes a zoom lens 210, an OIS (Optical Image Stabilizer) lens 220, a focus lens 230, and a diaphragm 260.

The zoom lens 210 is a lens for changing the magnification of a subject image formed by the optical system. The zoom lens 210 is composed of one or more lenses. The zoom lens 210 is driven by a zoom lens driver 211. The zoom lens driver 211 includes a zoom ring that can be operated by the user. Alternatively, the zoom lens driver 211 may include a zoom lever and an actuator or a motor. The zoom lens driver 211 moves the zoom lens 210 along the optical axis direction of the optical system in accordance with an operation by the user.

The focus lens 230 is a lens for changing the focus state of the subject image formed on the image sensor 110 by the optical system. The focus lens 230 is composed of one or more lenses. The focus lens 230 is driven by a focus lens driver 233.

The focus lens driver 233 includes an actuator or a motor, and moves the focus lens 230 along the optical axis of the optical system based on the control of the lens controller 240. The focus lens driver 233 can be realized by a DC motor, a stepping motor, a servo motor, an ultrasonic motor, or the like.

The OIS lens 220 is a lens for correcting a blur of a subject image formed by the optical system of the interchangeable lens 200 in an OIS function (function to correct camera shake by shifting the OIS lens 220). The OIS lens 220 moves in a direction that cancels out the blur of the digital camera 1, thereby reducing the blur of the subject image on the image sensor 110. The OIS lens 220 is composed of one or a more lenses. The OIS lens 220 is driven by an OIS driver 221.

Under the control of an OIS processor 223, the OIS driver 221 shifts the OIS lens 220 in a plane perpendicular to the optical axis of the optical system. A range in which the OIS lens 220 can be driven by the OIS driver 221 is mechanically limited. This is referred to as a range (drivable range) in which the OIS lens 220 can be mechanically driven by the OIS driver 221. The OIS driver 221 can be realized by a magnet and a flat coil, for example. A position sensor 222 is a sensor that detects the position of the OIS lens 220 in a plane perpendicular to the optical axis of the optical system. The position sensor 222 can be realized by a magnet and a Hall element, for example. The OIS processor 223 controls the OIS driver 221 based on the output of the position sensor 222 and the output of a gyro sensor 224 (blur detector).

The diaphragm 260 adjusts the amount of light incident on the image sensor 110. The diaphragm 260 is driven by a diaphragm driver 262 to control the size of its aperture. The diaphragm driver 262 includes a motor or an actuator.

The gyro sensor 184 or 224 detects a blur (vibration) in a yawing direction and a pitching direction based on the change in angle per unit time of the digital camera 1, that is, an angular velocity. The gyro sensor 184 or 224 outputs an angular velocity signal indicating the detected blur amount (angular velocity) to the BIS processor 183 or the OIS processor 223. The angular velocity signal output by the gyro sensor 184 or 224 may include a wide range of frequency components due to camera shake, mechanical noise, or the like. Instead of the gyro sensor, another sensor that can detect the blur of the digital camera 1 can also be used.

The camera controller 140 and the lens controller 240 may be configured by a hard-wired electronic circuit or a microcomputer using a program. For example, the camera controller 140 and the lens controller 240 can be realized by a processor such as a CPU, MPU, GPU, DSP, FPGA, or ASIC.

2. Operation

The operation of the digital camera 1 configured as described above will be described below.

For example, the digital camera 1 can operate in a live view mode, when the interchangeable lens 200 is attached to the camera body 100 and the operation for preparing for shooting is completed. The live view mode is an operation mode in which the image sensor 110 sequentially displays the image indicated by the generated image data on the liquid crystal monitor 120 as a through image.

In the operation for preparing for shooting, the camera controller 140 acquires lens data, AF data, and the like from the lens controller 240 via data communication between the camera body 100 and the interchangeable lens 200. The lens data is data indicating characteristic values specific to the interchangeable lens 200 such as a lens name, an F number, and a focal length. The AF data is data necessary for operating autofocus, and includes, for example, at least one of a focus drive speed, a focus shift amount, an image magnification, and contrast AF availability information. Each piece of these data is stored in a flash memory 242 in advance.

In the live view mode, since the through image is displayed as a moving image on the liquid crystal monitor 120, the user can determine a composition for capturing a still image while viewing the liquid crystal monitor 120. The user can select whether or not to set the live view mode. For example, instead of the live view mode, an operation mode for displaying an image in an electronic viewfinder (not shown) may be used. Hereinafter, an example in which the live view mode is used will be described.

2-1. Near/Far Shift Function

The digital camera 1 of the present embodiment provides a near/far shift function, which is a function for reducing or increasing a distance to a subject to be autofocused based on, for example, a user operation. The near/far shift function will be described with reference to FIGS. 3A to 4B.

Figure 3A:
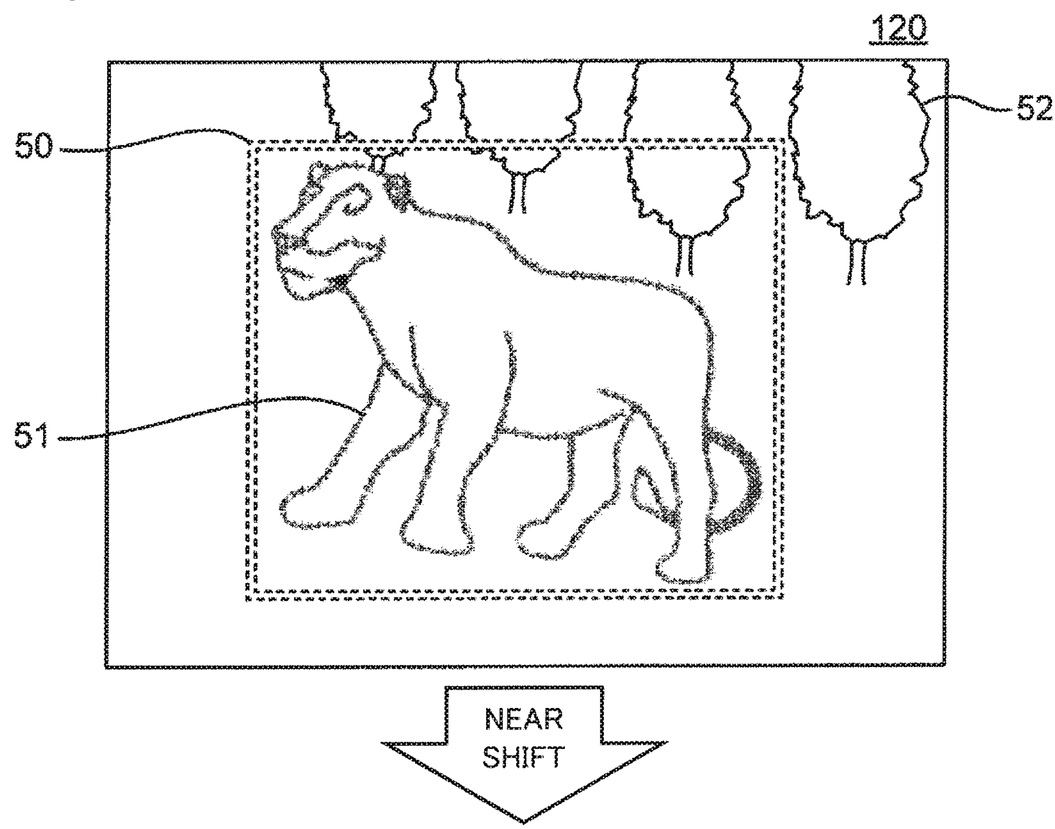
FIG. 3A is a diagram illustrating a focus state in which the background of a subject is focused in the digital camera.
Figure 3B:
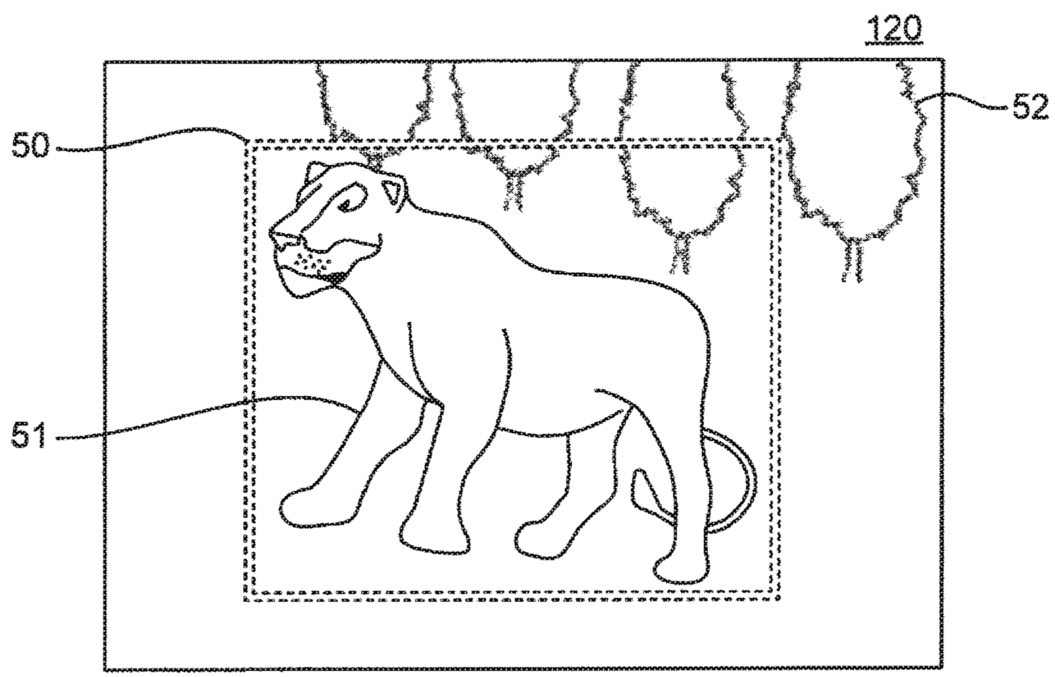
FIG. 3B is a diagram illustrating a focus state after a near shift operation from the situation of FIG. 3A.

FIGS. 3A and 3B are diagrams for explaining the near shift function in the digital camera 1 of the present embodiment.

FIG. 3A illustrates a focus state in which the digital camera 1 is focused on a background 52 of a subject 51. For example, such a focus state is assumed when the user operates the autofocus of the digital camera 1 by half-pressing the release button 131 while viewing the liquid crystal monitor 120 in the live view mode.

In the example of FIG. 3A, the desired subject 51 and the background 52, which is at a distance farther than the distance to the subject 51, are included in the range of an AF area 50. The AF area 50 is an area that is detected as a target to be focused in the captured image during the autofocus operation, and is appropriately set in the digital camera 1. In this example, the desired subject 51 is not in focus but the background 52 in the AF area 50 is focused by the autofocus.

According to the near shift function of the present embodiment in the above situation, the digital camera 1 receives an instruction for reducing a distance to the subject to be focused. Hereinafter, a user operation indicating such an instruction is referred to as a "near shift operation". FIG. 3B illustrates a focus state after the near shift operation is input from the situation of FIG. 3A.

Figure 4A:
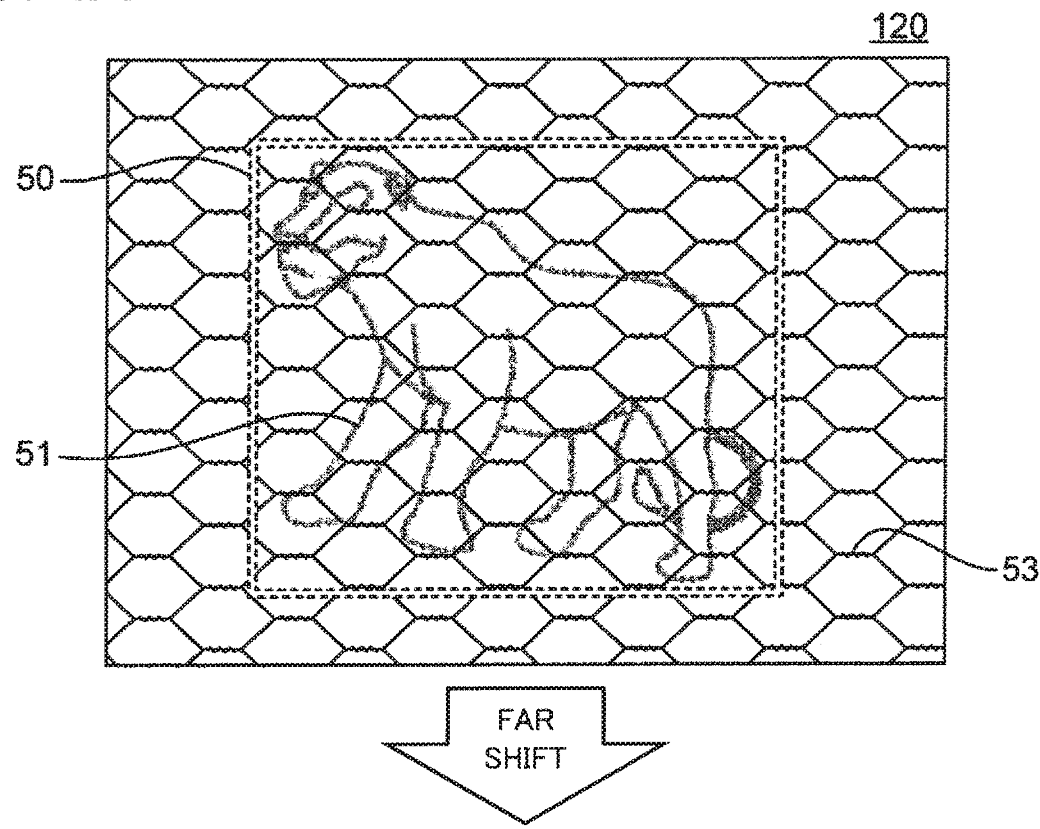
FIG. 4A is a diagram illustrating a focus state in which an obstacle with respect to a subject is focused in the digital camera.
Figure 4B:
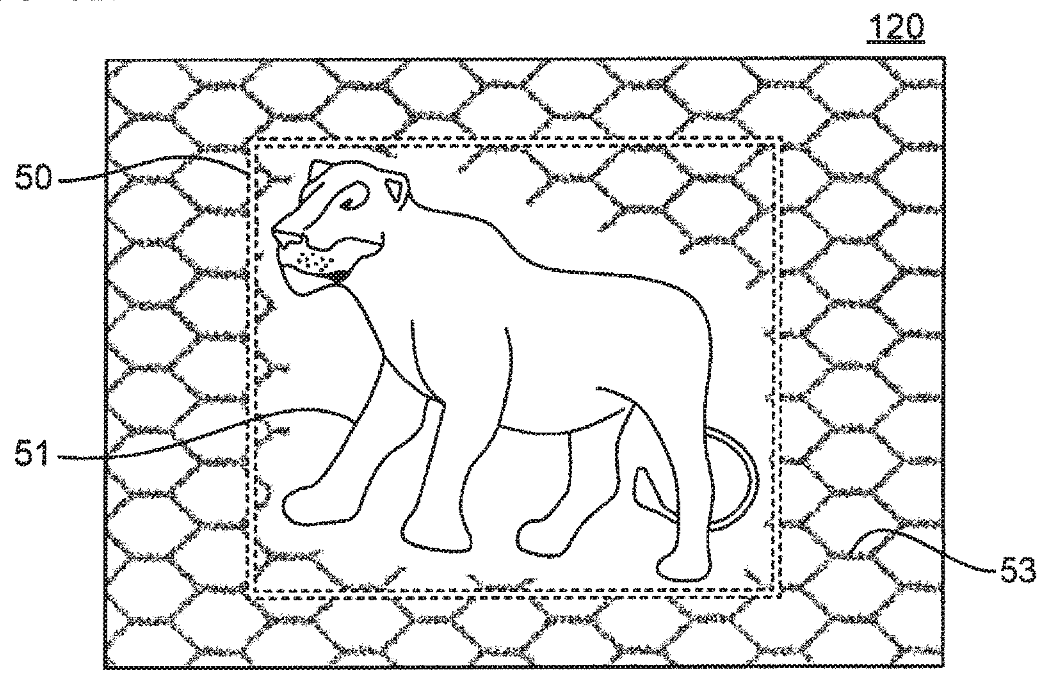
FIG. 4B is a diagram illustrating a focus state after a far shift operation is input from the situation of FIG. 4A.

FIGS. 4A and 4B are diagrams for explaining the far shift function in the digital camera 1 of the present embodiment.

FIG. 4A illustrates a focus state in which the obstacle 53 with respect to the subject 51 is focused. In this example, the desired subject 51 and the obstacle 53 (such as a fence), which is closer than the distance to the subject 51, are included in the range of the AF area 50. In this example, the desired subject 51 is not in focus but the obstacle 53 in the AF area 50 is in focus by the autofocus.

According to the far shift function of the present embodiment in the above situation, the digital camera 1 receives an instruction to increase the distance to the subject to be focused. Hereinafter, a user operation indicating such an instruction is referred to as a "far shift operation". FIG. 4B illustrates a focus state after the far shift operation is input from the situation of FIG. 4A.

As shown in FIGS. 3B and 4B, the near/far shift function of the present embodiment makes it possible to focus on the subject 51 intended by the user, even in a situation where the digital camera 1 has the background 52, the obstacle 53 or the like could be an obstacle to focusing on the subject 51 during autofocus.

The digital camera 1 of the present embodiment realizes the near/far shift function as described above by simple control for starting autofocus after limiting a drive range of the focus lens 230 to the desired range according to the near/far shift operation. Hereinafter, details of the operation of the digital camera 1 will be described.

2-2. Details of Operation

Details of the operation of the digital camera 1 that executes the near/far shift function of the present embodiment will be described with reference to FIGS. 5 to 6C. Hereinafter, the operation of the digital camera 1 in an AFS (Auto Focus Single) mode will be described as an example. The AFS mode is an operation mode that maintains a focus state obtained by once executing a focus operation that automatically detects a focus state while the release button 131 is continuously half-depressed in the auto-focus operation mode.

Figure 5:
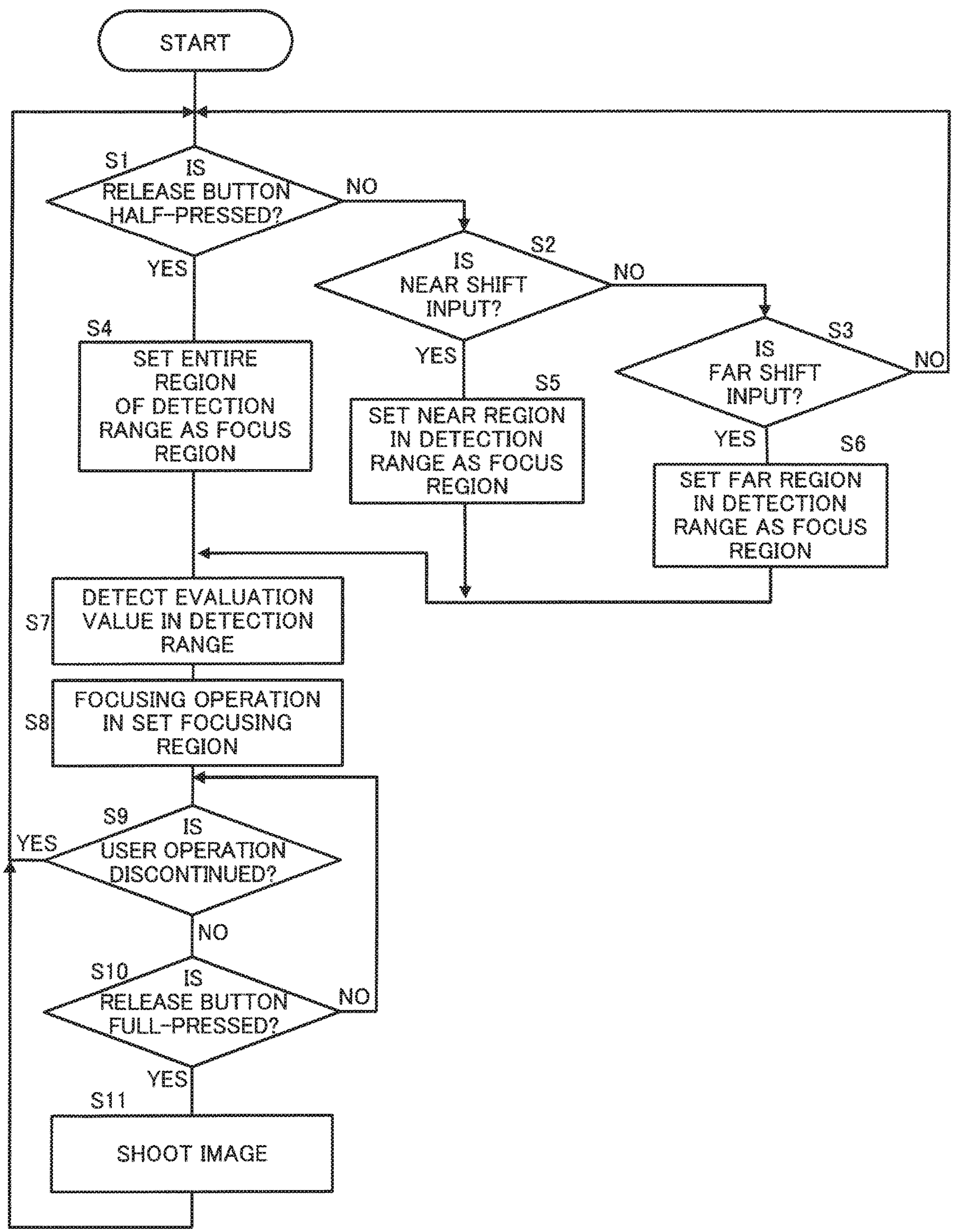
FIG. 5 is a flowchart illustrating a shooting operation of the digital camera according to the first embodiment.

FIG. 5 is a flowchart illustrating a shooting operation of the digital camera 1 according to the first embodiment. The flow shown in FIG. 5 starts when the digital camera 1 is set to the AFS mode for autofocus, for example, during the operation in the live view mode. Each process shown in the flowchart of FIG. 5 is executed by the camera controller 140, for example.

First, the camera controller 140 determines whether or not a user operation is received based on inputs from various operation members 130 (S1 to S3). The user operations subjected to the determination include, for example, a half-depressing operation (S1) of the release button 131, a near shift operation (S2), and a far shift operation (S3). For example, the near shift operation can be set in advance to a depressing operation of the Fn button 136, and the far shift operation can be set to a depressing operation of another Fn button 137. The camera controller 140 continues to monitor inputs from the various operation members 130 until receiving any of the above user operations (NO in S1 to S3).

When determining that the release button 131 has been half-depressed (YES in S1), the camera controller 140 sets an entire region of a detection range as a focusing region (S4). The detection range means a range where the evaluation value can be detected by the camera controller 140 with reference to position of the focus lens 230. The focusing region means a region subjected to a focusing operation (S8) described later in the detection range with respect to position of the focus lens 230, where the focus lens 230 is driven within the range of the focusing region.

In the present embodiment, the image plane phase difference method is adopted as the auto focus method, and the camera controller 140 detects an evaluation value over the detection range based on the image plane phase difference method (S7). The camera controller 140 performs a focusing operation in the focusing region set in step S4 (S8) to drive the focus lens 230. An example of normal autofocus operation is illustrated in FIG. 6A.

Figure 6A:
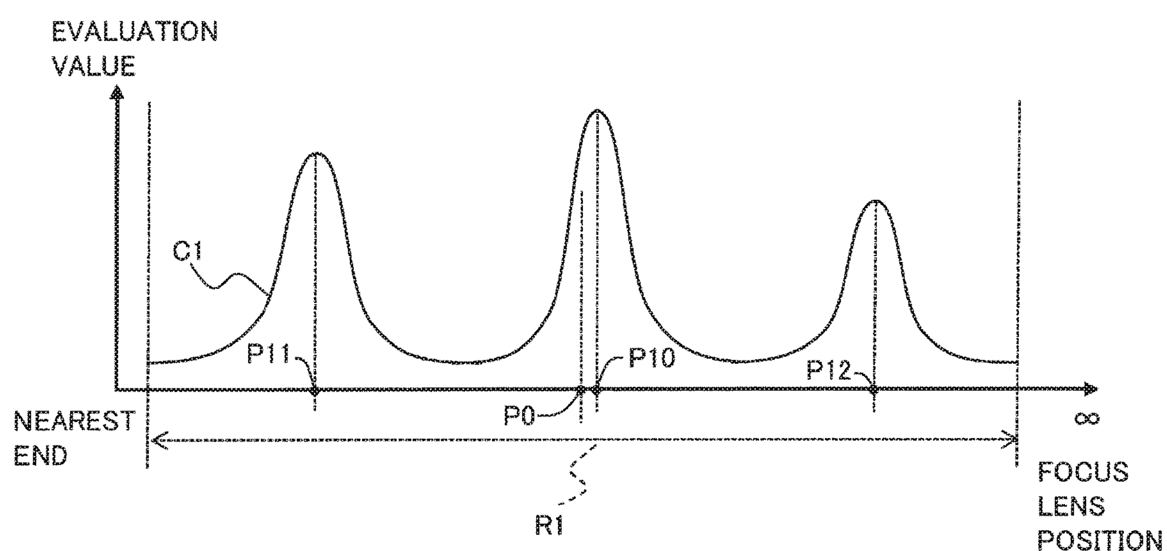
FIG. 6A is a diagram showing an example of normal autofocus operation in the digital camera.

FIG. 6A shows an example of a characteristic curve C1 obtained by the image plane phase difference method. The horizontal axis indicates a focus lens position, and the vertical axis indicates an evaluation value for evaluating the focus state. The focus lens position means a position of the focus lens 230 along the optical axis. The evaluation value indicates, for example, a degree of coincidence between outputs of left and right phase difference pixel groups in the image plane phase difference method.

In focusing operation such as the image plane phase difference method, the camera controller 140 of the digital camera 1 comprehensively calculates an evaluation value for each focus position within the detection range R1 in a state where the focus lens 230 is not moved particularly from the current position P0 (S7). As a result, a characteristic curve C1 is obtained. The focus lens position is defined between a closest end where the focus is closest to the digital camera 1 and an infinite end where the focus is farthest to the digital camera 1. Hereinafter, a direction of the focus lens position toward the closest end along the optical axis is referred to as "near side (or near direction)", and a direction of the focus lens position toward the infinite end along the optical axis is referred to as "far side (or far direction)". For example, the detection range R1 is defined by characteristics of the interchangeable lens 200, including a near side range and a far side range with respect to the current position P0.

The characteristic curve C1 in the example of FIG. 6A has three peak positions P10, P11, and P12. During normal autofocus, the camera controller 140 moves the focus lens 230 to, for example, a position showing the highest evaluation value in the detection range R1 set in the focusing region (S8). In the example shown in FIG. 6A, the peak position P10 has the highest evaluation value among the three peak positions P10, P11, and P12, and thus the focus lens 230 is moved to the peak position P10.

According to such normal autofocus as illustrated in FIG. 6A, the peak position P10 of the characteristic curve C1 in the vicinity of the current position P0 of the focus lens 230 is detected as a focus position.

On the other hand, when the user inputs a near shift operation (YES in S2), the camera controller 140 sets the near region in the detection range R1 as the focusing region (S5). Step S5 is a process for operating autofocus on a subject that is closer than usual. An operation example in this case is illustrated in FIG. 6B.

Figure 6B:
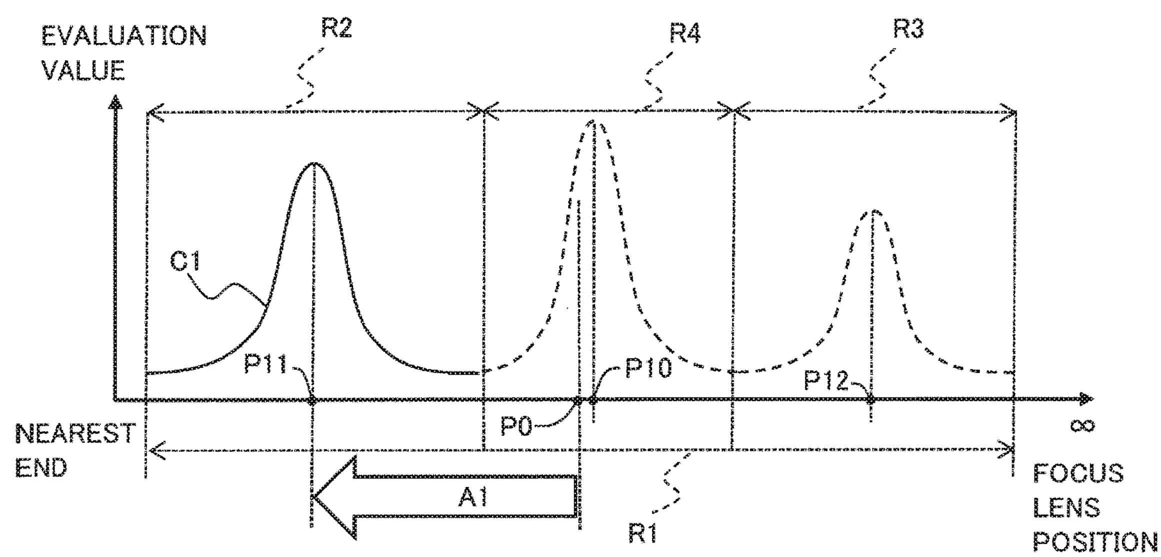
FIG. 6B is a diagram showing an example of autofocus operation using a near shift function.

The operation example of FIG. 6B illustrates a case where a near shift operation is input when the focus lens 230 has the current position P0 similar to FIG. 6A. The camera controller 140 defines, for example, a region located on the near side with respect to the current position P0 as a near region R2.

In the present embodiment, a far region R3 and a middle region R4 are defined in addition to the near region R2. The far region R3 is a region located on the far side with respect to the current position P0. The middle region R4 is a region located between the near region R2 and the far region R3.

In the example shown in FIG. 6B, the middle region R4 includes the current position P0, and the near region R2 and the far region R3 do not overlap with the current position P0. That is, the near region R2 is located only on the near side with respect to the current position P0, and the far region R3 is located only on the far side with respect to the current position P0.

As in the example shown in FIG. 6A, the camera controller 140 detects an evaluation value in the detection range R1 (S7) to obtain a characteristic curve C1.

Further, the camera controller 140 performs a focusing operation in the near region R2 set as the focusing region in step S5 (S8). More specifically, the focus lens 230 is moved to a position showing the highest evaluation value in the near region R2. In the example shown in FIG. 6B, the peak position P11 has the highest evaluation value in the near region R2, and thus the focus lens 230 is moved to the peak position P11 (as shown by arrow A1).

In FIG. 6B, the characteristic curve C1 in the near region R2 set as the focusing region is illustrated by a solid line, and the characteristic curve C1 in the far region R3 and the middle region R4 not set as the focusing region is illustrated by a dotted line. This applies to FIG. 6C.

When the user inputs a far shift operation (YES in S3), the camera controller 140 sets the far region R3 in the detection range R1 as the focusing region (S6). Step S6 is a process for operating autofocus on a subject that is farther away than usual. An operation example in this case is illustrated in FIG. 6C.

Figure 6C:
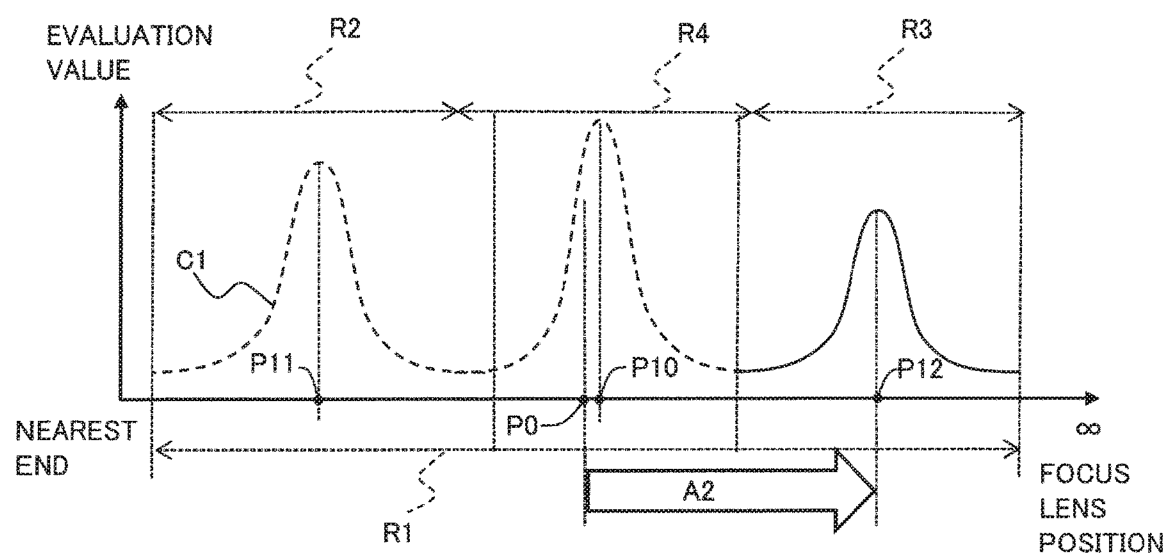
FIG. 6C is a diagram showing an example of autofocus operation using a far shift function.

The operation example of FIG. 6C illustrates a case where a far shift operation is input when the focus lens 230 has the current position P0 similar to FIGS. 6A and 6B. As in the example illustrated in FIG. 6B, the camera controller 140 defines a near region R2, a far region R3, and a middle region R4 in the detection range R1.

As in the example shown in FIG. 6B, the camera controller 140 detects an evaluation value in the detection range R1 (S7) to obtain a characteristic curve C1.

Further, the camera controller 140 performs a focusing operation in the far region R3 set as the focusing region in step S6 (S8). More specifically, the focus lens 230 is moved to a position showing the highest evaluation value in the far region R3. In the example shown in FIG. 6C, the peak position P12 has the highest evaluation value in the far region R3, and thus the focus lens 230 is moved to the peak position P12 (as shown by arrow A2).

Returning to FIG. 5, in the focus state where the focus lens 230 is in the focus position as a result of the focusing operation (S8), the camera controller 140 determines whether or not the user operation input in steps S1 to S3 has been canceled (S9). For example, when the user operation is continued on at least one of the release button 131, the Fn button 136 for near shift function, and the Fn button 137 for far shift function, the process proceeds to NO in step S9.

The camera controller 140 determines whether or not the release button 131 has been fully depressed (S10) while the user operation is being continued (NO in S9). When the release button 131 is fully depressed (YES in S10), the camera controller 140 executes shooting (S11). At this time, the camera controller 140 records image data based on a imaging result of the image sensor 110 in the memory card 171. Thereafter, the camera controller 140 executes the processes from step S1 again.

On the other hand, when the release button 131 is not fully depressed (NO in S10), the camera controller 140 returns to step S9. As a result, the AFS operation is realized for maintaining the focus state obtained in the focusing operation (S8) before step S9.

If any user operation in steps S1 to S3 is not continued (YES in S9), the camera controller 140 returns to step S1. Thereafter, when a user operation is input again (YES in S1 to S3), the position of the focus lens 230 defined by step S8 is set as the current position, and the process of steps S4 to S8 is performed again according to the input user operation.

According to the above processing, a near/far shift function for reducing or increasing a distance to a subject to be focused according to a user operation is realized. For example, when the user inputs a near shift operation (YES in S2) in the situation of FIG. 3A, the peak position P11 distant from the vicinity of the current position P0, such as the in-focus position of the background 52, toward the near side is detected. Thereby, the focus state with respect to the desired subject 51 is obtained as illustrated in FIG. 3B. Further, for example, when the user inputs a far shift operation (YES in S3) in the situation of FIG. 4A, the peak position P12 distant from the obstacle 53 toward the far side is detected, thereby obtaining the desired focus state as illustrated in FIG. 4B.

The near/far shift operation as described above can be input a plurality of times, for example, by repeatedly depressing and releasing the Fn buttons 136 and 137 (S2, S3, S9). Accordingly, even if there are a large number of peak positions in the characteristic curve C1, it is possible to selectively focus on the peak position desired by the user by several times of the near/far shift operations.

3. Summary

As described above, each of the digital camera 1 and the camera body 100 in the present embodiment is an example of an imaging apparatus, and includes the image sensor 110 as an example of an imager and the camera controller 140 as an example of a controller. The image sensor 110 is configured to capture a subject image formed via the interchangeable lens 200 as an example of an optical system including the focus lens 230, to generate image data. The camera controller 140 controls a focusing operation for adjusting a position of the focus lens 230 along the optical axis in the optical system according to an evaluation value for focus state. The camera controller 140 calculates the evaluation value over a detection range R1 with respect to position of the focus lens 230 to perform a focusing operation. In response to an instruction to reduce or increase a distance to a subject to be focused (S2, S3), the camera controller 140 sets, in the detection range R1, the near region R2 or the far region R3, which is an example of a region including a position close to a closest end or an infinite end with respect to the current position P0 of the focus lens 230 according to a direction specified by the instruction, as a focusing region (S5, S6). In the focusing operation, the camera controller 140 adjusts the position of the focus lens 230 within the set near region R2 or the set far region R3 (S8).

According to the above imaging apparatus, it is easy to exclude, from focusing operation detection target, focus positions in the vicinity of the focus lens 230 before receiving the instruction. Even in a situation where there is a background 52, an obstacle 53, or the like that may become an obstacle to focusing on the desired subject 51, it is possible to easily focus on the desired subject 51 based on the above instruction.

The imaging apparatus according to the present embodiment further includes an operation member 130 configured to receive a user operation. In response to an instruction by a user operation on the operation member 130 (S2, S3), the camera controller 140 sets the focusing region in the detection range R1 (S5, S6). Thereby, it is easy to achieve focusing on the subject according to the user's intention by the near shift operation or the far shift operation of the user.

In the present embodiment, the camera controller 140 calculates the evaluation value by the image plane phase difference method. Thus, autofocus using the image plane phase difference method is realized.

In the present embodiment, the camera controller 140, in response to the near shift operation as an example of the instruction to reduce the distance to a subject (YES in S2), sets the near region R2 close to the closest end with respect to the current position P0 of the focus lens 230 from the detection range R1, as the focusing region (S5). Thereafter, a focusing operation is performed in the near region R2, thereby easily focusing on a relatively close subject.

In the present embodiment, the camera controller 140, in response to the far shift operation as an example of the instruction to increase the distance to a subject (YES in S3), sets the far region R3 close to the infinite end with respect to the current position P0 of the focus lens 230 from the detection range R1, as the focusing region (S6). Thereafter, a focusing operation is performed in the far region R3, thereby easily focusing on a relatively far subject.

In the present embodiment, the camera controller 140 defines, in the detection range R1, a middle region R4 as an example of a first region, a near region R2 as an example of a second region, and a far region R3 as an example of a third region. The middle region R4 is a region including the current position P0 of the focus lens 230, the near region R2 is a region closer to the closest end than the middle region R4, and the far region R3 is a region closer to the infinite end than the middle region R4. The camera controller 140 sets one of the near region R2 and the far region R3 as a focusing region to be subjected to a focusing operation (S8), based on a direction specified by a near shift operation or a far shift operation as an example of an instruction. Thereby, it is easy to achieve focusing on the subject according to the user's intention by the near shift operation or the far shift operation of the user.

Second Embodiment

In the first embodiment, the operation example of the digital camera 1 that applies the near/far shift function to the AFS mode has been described. In the second embodiment, an example in which the near/far shift function is applied to another operation mode will be described.

Hereinafter, the description of the similar configuration and operation to the digital camera 1 according to the first embodiment will be omitted as appropriate, and the digital camera 1 according to the present embodiment will be described.

FIG. 7 is a flowchart illustrating a shooting operation of the digital camera 1 according to the second embodiment. Hereinafter, the operation of the digital camera 1 in an AFC (Auto Focus Continuous) mode will be described as an example. The AFC mode is an operation mode in which the focusing operation is repeatedly executed with the focus state continuously updated while the release button 131 is continuously half-depressed.

In the operation example shown in FIG. 7, the camera controller 140 performs the processes of steps S1 to S8, S10, and S11 as in the first embodiment. In this case, when the camera controller 140 determines that the release button 131 is not fully depressed (NO in S10), the process from step S1 is executed again. Thus, while the release button 131 is being half-depressed (YES in S1), the focusing operation in step S8 is repeatedly executed, and thus the operation in the AFC mode is realized.

In this operation example, the camera controller 140 performs processing using a near flag F1 and a far flag F2 instead of step S9 in FIG. 5 (S21 to S25, S31 to S35). The near flag F1 and the far flag F2 are flags for managing the states of the near/far shift functions by ON/OFF, respectively, and are stored in the RAM 141.

For example, when the near shift operation is not input (NO in S2), the near flag F1 is set to "OFF" (S21). When it is determined that a near shift operation is input (YES in S2), the camera controller 140 determines whether or not the near flag F1 is "OFF" (S22).

When the near flag F1 is "OFF" (YES in S22), the camera controller 140 performs setting for the near shift function (S5). Thereafter, the camera controller 140 sets the near flag F1 to "ON" (S23), and proceeds to step S7.

On the other hand, when the near flag F1 is "ON" (NO in S22), the camera controller 140 proceeds to step S7 without performing the processes of steps S5 and S23.

In addition, even in a state that the release button 131 is half-depressed (YES in S1), the camera controller 140 determines, as in step S21, whether or not a near shift operation is input (S24). Also at this time, when the near shift operation is not input (NO in S24) the camera controller 140 sets the near flag F1 to "OFF" (S25). Further, when the near shift operation is input (YES in S24), the camera controller 140 proceeds to the determination in step S22.

As described above, according to the processing (S21 to S25) using the near flag F1, the focusing operation by the near shift function is executed as many times as inputs of the near shift operation. In this operation example, when the depressing operation of the Fn button 136 of the near shift function is continued, the focusing operation by the near shift function is performed once, and then the normal focusing operation is repeated.

Regarding the far shift function, the camera controller 140 uses the far flag F2 instead of the near flag F1, and performs the same processing as steps S21 to S25 according to the far shift operation (S31 to S35). Accordingly, also with respect to the far shift function, the focusing operation by this function is executed as many times as inputs of the far shift operation.

Although the operation example in the AFC mode has been described above, the near/far shift function can be applied also to various other operation modes. For example, by performing the same processing as in FIG. 7 in a continuous shooting AF operation mode in which still images are shot continuously, the near/far shift function can be applied to continuous shooting AF. Further, the near/far shift function can be applied in the same manner as described above not only for still images but also when the digital camera 1 operates to capture a moving image.

As described above, in the present embodiment, in response to an instruction to use the near/far shift function given during execution of various operations that continuously repeat the focusing operation (S24, S34), the camera controller 140 sets the focusing region from the detection range R1 (S5, S6) and performs the focusing operation again in the set focusing region (S8). Accordingly, it is possible to easily focus on a desired subject even during various operations for continuously performing the focusing operation.

Other Embodiments

As described above, the first and second embodiments have been described as examples of the technology disclosed in the present application. However, the technology in the present disclosure is not limited to this, and can also be applied to embodiments in which changes, substitutions, additions, omissions, and the like have been made as appropriate. Further, it is also possible to combine the components described in the first and second embodiments to form a new embodiment. Accordingly, other embodiments will be exemplified below.

In each of the above embodiments, an example is described in which autofocus of the image plane phase difference method is employed, but the present disclosure is not limited to the image plane phase difference method. Any method can be used as long as the evaluation value is calculated over the detection range R1 without driving the focus lens 230 as shown in step S7 in FIG. 5, to obtain the characteristic curve C1 as shown in FIGS. 6A to 6C. Examples of such a method include a phase difference method and a DFD (Depth From Defocus) method. For example, the evaluation value may be a cost value in DFD. According to these methods, unlike a method that requires driving the focus lens 230 for detecting an evaluation value over a predetermined detection range such as a contrast method, the evaluation value over the detection range R1 and the detection range R1 can be detected at once. This makes it possible to quickly execute a control of setting a specific region in the detection range R1 as a focusing region and performing a focusing operation in the set region.

Further, in each of the above embodiments, the focusing region is set in the detection range R1 (S5, S6), and then the evaluation value of the detection range R1 is calculated (S7). However, the present invention is not limited thereto. After calculating the evaluation value of the detection range R1, the focusing region may be set in the detection range R1.

In each of the above embodiments, as shown in FIGS. 6B and 6C, the near region R2 or the far region R3 is set as the focusing region after defining three regions R2 to R4 in the detection range R1. However, the present invention is not limited thereto. For example, when the near shift is input (YES in step S2), only the near region R2 may be defined and selected from the detection range R1, and set as the focusing region. Further, when the far shift is input (YES in step S3), only the far region R3 may be defined and selected from the detection range R1, and set as the focusing region. Alternatively, two or four or more regions may be defined in the detection range R1, and one near region or one far region may be set as the focusing region from among the regions.

Further, in each of the above embodiments, as shown in FIGS. 6B and 6C, the near region R2 and the far region R3 do not overlap the current position P0 of the focus lens 230, and are located only on the near side and only on the far side, respectively. However, the present invention is not limited thereto. The near region R2 or the far region R3 may overlap the current position P0 of the focus lens 230. In this case, the center position of the near region R2 only needs to be shifted to the near side from the current position P0, and the center position of the far region R3 only needs to be shifted to the far side from the current position P0. That is, the near region R2 may be a region including a position on the near side from the current position P0 of the focus lens 230, and the far region R3 may be a region including a position on the far side from the current position P0 of the focus lens 230.

Further, in each of the above embodiments, the normal autofocus of FIG. 6A performs, in the focusing operation in step S8, focusing on the position showing the highest evaluation value in the detection range R1. However, the present invention is not limited thereto, other focusing methods may be used. For example, the focusing may be performed on the peak position closest to the current position P0. In the example of FIG. 6A, the peak position P10 is closest to the current position P0, but other peak positions such as the peak positions P1 and P12 may be the peak positions closest to the current position P0.

In each of the above embodiments, the depressing operation of the Fn buttons 136 and 137 is illustrated as an example of the near/far shift operation. The near/far shift operation is not particularly limited to this, and may be various user operations. For example, the near/far shift operation may be a double click, simultaneous pressing, long pressing, or the like on the various buttons on the operation member 130. The near/far shift operation may be a combination of a half-depressing operation of the release button 131 and an operation such as an MF ring or a dial. Further, in the menu setup, the half-depressing operation of the release button 131 may be set to either the near shift operation or the far shift operation, for example.

In each of the above embodiments, the instruction for using the near/far shift function is given by a user operation. However, the instruction is not limited to the user operation, and may be given by, for example, autonomous determination in the digital camera 1. For example, when a through image as shown in FIG. 4A is obtained, the camera controller 140 detects that the focus is on a specific obstacle 53 such as a fence by image recognition, and it can be an autonomous instruction to use a far shift function. Such image recognition can be easily realized by machine learning, for example. Alternatively, the digital camera 1 may store, in a flash memory 142 or the like, a user operation log such as a history of using the near/far shift operation previously, and automatically instruct the near/far shift function based on the operation log.

In each of the above embodiments, an example has been described in which both the near shift function and the far shift function are realized. In the digital camera 1 of the present embodiment, one of the near shift function and the far shift function may be implemented. This also facilitates focusing on the subject 51 desired by the user under the situation as shown in FIG. 3A or FIG. 4A.

In each of the above embodiments, the lens-interchangeable type digital camera has been described as an example of the imaging apparatus. However, the imaging apparatus of the present embodiment may be a digital camera that is not particularly an interchangeable lens type. The idea of the present disclosure can be applied not only to a digital camera but also to a movie camera, and an electronic device having various imaging functions such as a mobile phone or a PC with a camera.

As described above, the embodiments have been described as examples of the technology in the present disclosure. For this purpose, the accompanying drawings and detailed description are provided.

Accordingly, among the components described in the accompanying drawings and the detailed description, not only the components essential for solving the problem, but also the components not essential for solving the problem may also be included in order to illustrate the above technique. Therefore, it should not be immediately recognized that these non-essential components are essential as those non-essential components are described in the accompanying drawings and detailed description.

Moreover, since the above-mentioned embodiments are for demonstrating the technique in the present disclosure, various changes, substitutions, additions, omissions, etc. can be performed in a claim or its equivalent range.

The present disclosure can be applied to various imaging apparatuses that perform a focusing operation.

What is claimed is:

1. An imaging apparatus, comprising:

an imager configured to capture a subject image formed via an optical system including a focus lens, to generate image data; and a controller configured to control a focusing operation for adjusting a position of the focus lens along an optical axis in the optical system according to an evaluation value for focus state, wherein the controller calculates the evaluation value over a detection range with respect to position of the focus lens to perform the focusing operation, and in response to an instruction to reduce or increase a distance to a subject to be focused in a case where a first subject and a second subject having a different distance from the first subject are within an autofocus area the controller sets, among a plurality of user-selectable predefined regions in the detection range with respect to position of the focus lens and in which a focus position of the focus lens has not yet been calculated in the plurality of user-selectable predefined regions, a region including a shifted position toward a closest end or an infinite end with respect to a current position of the focus lens according to a direction specified by the instruction, as a focusing region, and adjusts the position of the focus lens within the set focusing region in the focusing operation.

2. The imaging apparatus according to claim 1, further comprising an operation member configured to receive a user operation, wherein the controller sets the focusing region in response to the instruction by a user operation on the operation member.

3. The imaging apparatus according to claim 1, wherein the controller calculates the evaluation value by at least one of an image plane phase difference method, a phase difference method, and a DFD (Depth From Defocus) method.

4. The imaging apparatus according to claim 1, wherein the controller, in response to the instruction to reduce the distance to a subject, sets the region close to the closest end with respect to the current position of the focus lens from the detection range, as the focusing region.

5. The imaging apparatus according to claim 1, wherein the controller, in response to the instruction to increase the distance to a subject, sets the region close to the infinite end with respect to the current position of the focus lens from the detection range, as the focusing region.

6. The imaging apparatus according to claim 1, wherein the controller defines, in the detection range, a first region including the current position of the focus lens, a second region closer to a closest end than the first region, and a third region closer to an infinite end than the first region, and sets one of the second region and the third region as the focusing region based on a direction specified by the instruction.

7. The imaging apparatus according to claim 1, wherein in response to the instruction given during an operation of continuously repeating the focusing operation, the controller sets a focusing region from the detection range and executes the focusing operation within the set focusing region.

8. The imaging apparatus according to claim 1, wherein the direction specified by the instruction to reduce the distance is toward the closest end and the direction specified by the instruction to increase the distance is toward the infinity end.

9. The imaging apparatus according to claim 1, wherein the first subject and the second subject are overlapping one another within the autofocus area.

10. The imaging apparatus according to claim 1, further comprising a release button which, when half-pressed, causes the imaging apparatus to perform auto-focus operation in the set focusing region and, when fully pressed, causes the image data generated from the captured subject image to be recorded in memory, and wherein the controller sets the region including the shifted position toward the closest end or the infinite end with respect to the current position of the focus lens according to the direction specified by the instruction as the focusing region, prior to the release button being half-pressed.

* * * * *